(12) United States Patent
Baker

(10) Patent No.: US 8,108,368 B2
(45) Date of Patent: Jan. 31, 2012

(54) SYSTEM FOR PROCESSING AND USING ELECTRONIC DOCUMENTS

(76) Inventor: Allen F. Baker, Evans, GA (US)

(*) Notice: Subject to any disclaimer, the term of this patent is extended or adjusted under 35 U.S.C. 154(b) by 0 days.

(21) Appl. No.: 12/855,843

(22) Filed: Aug. 13, 2010

(65) Prior Publication Data

US 2011/0087641 A1 Apr. 14, 2011

Related U.S. Application Data

(63) Continuation of application No. 11/903,071, filed on Sep. 20, 2007, now Pat. No. 7,778,982.

(51) Int. Cl.
*G06F 17/30* (2006.01)
(52) U.S. Cl. ........................ 707/694; 707/756
(58) Field of Classification Search .................... 707/694
See application file for complete search history.

(56) References Cited

U.S. PATENT DOCUMENTS

| | | | | |
|---|---|---|---|---|
| 7,165,216 B2* | 1/2007 | Chidlovskii et al. | .......... | 715/237 |
| 2003/0061229 A1* | 3/2003 | Lusen et al. | .................. | 707/102 |
| 2004/0044985 A1* | 3/2004 | Kompalli et al. | ............. | 717/100 |
| 2004/0122851 A1* | 6/2004 | Kinno et al. | ................... | 707/102 |
| 2004/0205605 A1* | 10/2004 | Adler et al. | ..................... | 715/517 |
| 2005/0198569 A1* | 9/2005 | Fong et al. | ..................... | 715/513 |
| 2008/0126402 A1* | 5/2008 | Sikchi et al. | .................. | 707/102 |
| 2009/0164474 A1* | 6/2009 | Noumeir | ........................ | 707/10 |

* cited by examiner

*Primary Examiner* — don wong
*Assistant Examiner* — Binh V Ho
(74) *Attorney, Agent, or Firm* — SNR Denton US LLP

(57) ABSTRACT

The illustrative embodiments provide a system and method for processing a document. A data storage unit is provided to store data corresponding to the document, several documents processed at a previous time, and a set of rules. A rule in the set of rules may include a rule identifier, a directive to proceed to a second rule based on a condition, a specification of a data component, the specification configured to include a data component identifier, a data component attribute, and a directive to proceed to a second specification of a second data component based on a second condition. A rules-based engine is provided that may communicate with the data storage unit and may execute a rule in the set of rules. The set of rules may include rules for parsing, validating, identifying, relating, selecting, extracting, transforming, generating, analyzing, error correcting, reporting, and sending.

24 Claims, 6 Drawing Sheets

Figure 5                 ⌒ 500

```
    *270HS004010X092 ELIGIBILITY, COVERAGE OR BENEFIT
    INQUIRY (270)
501 !header,isa iea wrapper
       isa,r,1,000001,Interchange Control Header
       gs,r,1,0010002,Functional Group Header
       goto,st,1000;$en,$c.1000

!1000 st transaction wrapper
       st,r,1,036010,Transaction Set Header
       bht,r,1,038020,Beginning of Transaction
       goto,hl*20,2000a;$en,$c.2000a !2000a information source level
       hl*20,r,1,041010,Information Source Level
       goto,nml,2100a !2100a information source name
       nml,r,1,044030,Information Source Name
       goto,hl*21,2000b;$en,$en,$c.2000b !2000b information receiver level
       hl*21,r,1,047010,Information Receiver Level
       goto,nml,2100b;$c.2100b 506  508   510  512
       \   504  /    /
        \  /   /    /
    ⎧ !2100b information receiver name
    ⎪   nml,r,1,050030,Info Receiver Name
    ⎪   ref,s,m,054040,Info Receiver Additional Info
502 ⎨   n3,s,1,057060,Info Receiver Address
    ⎪   n4,s,1,058070,Info Receiver CSZ
    ⎪   per,s,m,060080,Info Receiver Contact
    ⎪   prv,s,1,064090,Info Receiver Provider
    ⎩   goto,hl*22,2000c;$en,$en,$c.2000c 514  516  518   520

!2000c subscriber level
       hl*22,r,1,066010,Subscriber Level
       trn,s,2,069020,Subscriber Trace
       goto,nml*il,2100c;c.2100c !2100c subscriber name
       nml*il,r,1,071030,Subscriber Name
       ref,s,m,074040,Subscriber Additional Info
       n3,s,1,077060,Subscriber Address
       n4,s,1,078070,Subscriber CSZ
       prv,s,1,080090,Provider Info
       dmg,s,1,083100,Subscriber Demo
       ins,s,1,085110,Subscriber Relationship
       dtp,s,m,087120,Subscriber Date
       goto,eq,2110c;$c.2110c
       goto,hl*23,2000d;$en,$en,$c.2000d
       goto,^,4000;$en,$en,$e,$s
```

```
    !2110c subscriber eligibility or benefit inquiry
       eq,s,1,089130,Subscriber Eligibility
       amt,s,1,099135,Subscriber Spend Down
       iii,s,m,101170,Subscriber Benefit
       ref,s,1,104190,Subscriber Additional Info
       dtp,s,1,106200,Subscriber Benefit Date
       goto,eq,2110c;$en
       goto,nml*il,2100c;$en,$en,$s,$c.2100c
       goto,hl*22,2000c;$en,$en,$en,$s,$c2000c
       goto,^,4000;$en,$en,$en,$en,$s !2000d dependent level
       hl*23,r,1,066010,Dependent Level
       trn,s,2,069020,Dependent Track
       goto,nml*03,2100d;c.2100d !2100d dependent name
       nml*03,r,1,071030,Dependent Name
       ref,s,m,074040,Dependent Additional Info
       n3,s,1,077060,Dependent Address
       n4,s,1,078070,Dependent CSZ
       prv,s,1,080090,Provider Info
       dmg,s,1,083100,Dependent Demo
       ins,s,1,085110,Dependent Relationship
       dtp,s,m,129120,Dependent Date
       goto,eq,2110d;$en,$c.2110d
       goto,hl*23,2000d;$en,$en,$c.2000d !2110d dependent eligibility or benefit inquiry
       eq,s,1,089130,Dependent Eligibility
       iii,s,m,101170,Dependent Inquiry
       ref,s,1,143190,Dependent Additional Info
       dtp,s,1,145190,Dependent Benifit Date
       -se,s,1,147210,Transaction Set Trailer
       goto,eq,2110c;$en
       goto,hl*23,2000d;$en,$en,$s,$c.2000d
       goto,hl*22,2000c;$en,$en,$s,$c.2000c
       goto,^,4000;$en,$en,$s !*4000 Dispatch for end of claim
       -se,s,1,573555,Transaction Set Trailer
       -ge,s,1,900001,Function Group Trailer
       -iea,s,1,900100,Interchange Control Trailer
       goto,st,1000;$c.1000
       goto,hl*21,2000b;$c.2000b
       goto,hl*20,2000a;$c.2000a goto,^,stop;$save
```

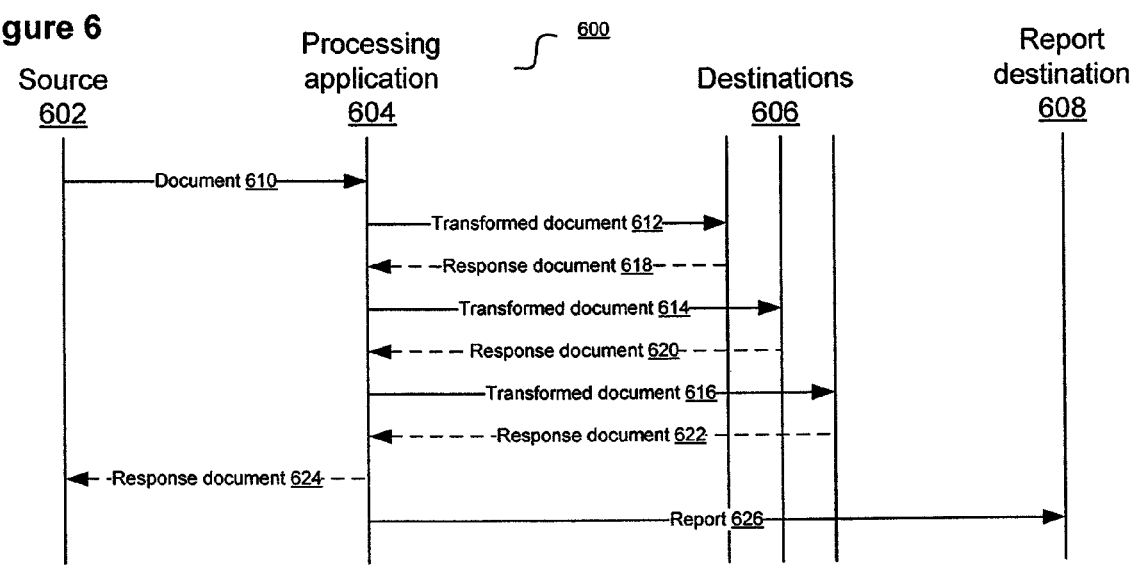

SYSTEM FOR PROCESSING AND USING ELECTRONIC DOCUMENTS

CROSS-REFERENCE TO RELATED APPLICATIONS

This application is a Continuation of U.S. patent application Ser. No. 11/903,071 filed on Sep. 20, 2007, now U.S. Pat. No. 7,778,982, the entire teachings of which are herein incorporated by reference.

BACKGROUND

1. Field of the Invention

The principles of the present invention relate generally to an improved data processing system, and in particular, to an improved document processing system. Still more particularly, the principles of the present invention relate to a method, apparatus, and computer usable program product for processing and using electronic documents.

2. Description of the Related Art

Businesses exchange electronic documents with each other in order to conduct business transactions. For example, such electronic documents may include requests for product information, orders for products, invoices for sold goods and services, shipping notice, and confirmation of orders received.

For these and other similar purposes, many business transactions rely on electronic documents that have been standardized, such as by a standard description to include in a specific transaction for a specific industry. American National Standards Institute (ANSI) has developed standards for electronic documents used in a variety of business transactions under a specification called the X.12 specification. Similarly, the United Nations has promulgated a different set of standards for electronic documents under a standard called the United Nations Electronic Data Interchange for Administration Commerce and Transport (UNEDIFACT or UN-EDIFACT).

Parties, such as business organizations, often develop their own proprietary standards for the electronic documents they exchange with other parties, such as their business partners. These proprietary standards include specifications for electronic documents that may be based on a standard, such as ANSI X.12 or UN-EDIFACT standard, or may be a completely proprietary design.

Electronic documents conforming to a particular standard are usually referred to as a document of that standard. For example, an X.12 document is an electronic document that conforms to X.12 standards.

Electronic documents generally include information organized in some structure. The organization of that structure may be specified by a standard, such as ANSI X.12. The organization of the structure may be specified in the document itself, such as an extensible markup language (XML) document.

Using X.12 documents as an example, the complete electronic document from start to finish is called a "document." Within the organization of the document, data is organized in smaller organizations, called "segments." A piece of data in a segment is called a "data element." Within a segment, data elements are arranged in a variety of ways.

Data elements may be separated from each other by specialized characters called "delimiters." Alternatively, data elements may be separated from each other by fixed lengths of the data elements themselves. Segments are also separated from each other by delimiters or fixed lengths of the segments, just as data elements.

Data elements can be grouped together to form "composite data" within a segment. Segments can be grouped together to form a "transaction" within the document. Occasionally, several documents can be grouped together to form a "file" in a data transmission.

Software applications are used to facilitate the exchange of electronic documents between parties. These software applications primarily ensure that an electronic document is communicated to and is understandable by the intended recipient of that document. Such software applications are available as software products that a party can acquire and use for their own electronic document needs. Third parties also provide services based on such software applications, and a party can use such third-party services for exchanging electronic documents with another party.

SUMMARY

The illustrative embodiments provide a system and method for processing a document. A data storage unit is provided to store data corresponding to the document, several documents processed at a previous time, and a set of rules. A rule in the set of rules may include a rule identifier, a directive to proceed to a second rule based on a condition, a specification of a data component, the specification configured to include a data component identifier, a data component attribute, and a directive to proceed to a second specification of a second data component based on a second condition. A rules-based engine is provided that may communicate with the data storage unit and may execute a rule in the set of rules. The set of rules may include a rule for parsing, a rule for validating, a rule for identifying, a rule for relating, a rule for selecting, a rule for extracting, a rule for transforming, a rule for generating, a rule for analyzing, a rule for error correcting, and a rule for reporting.

A processing engine is provided that may include a parsing component, a validating component, a relating component, and an extracting component. The processing engine may communicate with the data storage unit to process the document in a non-sequential manner and may select and execute a rule using the rules-based engine. An error correction component is provided that may communicate with the rules-based engine, the processing engine, or both. A data communication component is provided that may communicate with the data storage unit, the rules-based engine, the processing engine, the analysis engine, the reporting engine, the error correction component, or any combination thereof.

The system may process the document using the data storage unit, the rules-based engine, the processing engine, and the error correction component. The system may transform the document into a set of second documents and generate a third document. The system may use the data communication component to deliver the second documents in the set of second documents to their respective destinations.

The system may also include an analysis engine and a reporting engine each of which may communicate with the rules-based engine, the processing engine, the data storage, or any combination thereof. The analysis engine may receive a request for analytical information, perform analysis of the stored information according to the request, and return a result of the analysis.

The reporting engine may receive a request from a source of the document, a destination of a transformed document in a set of transformed documents, a destination of a report, or an independent party. The system may authenticate the request and/or a source of the request before processing the request.

The system may also include a user interface component that may support features to graphically configure the rules in the set of rules, to graphically create a new rule, to graphically include the new rule in the set of rules, and to graphically modify a rule other than the new rule in the set of rules to reference the new rule.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 5 depicts a processing rule in accordance with an illustrative embodiment;

FIG. 6 depicts a timing diagram representing a processing of an electronic document in accordance with an illustrative embodiment;

DETAILED DESCRIPTION OF THE DRAWINGS

Figure 1:
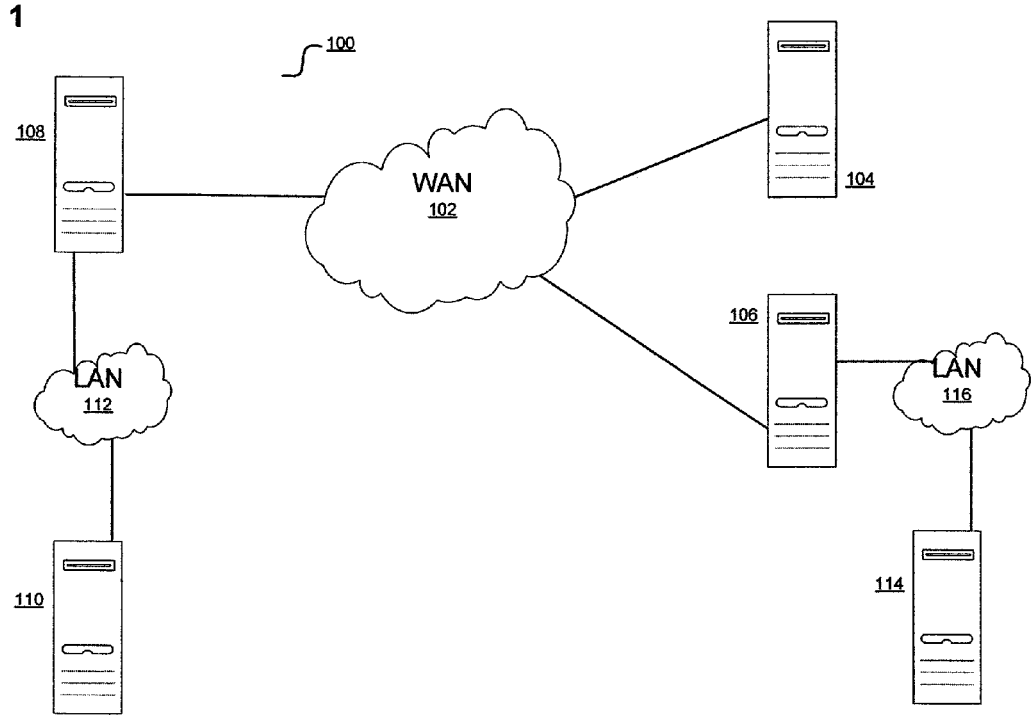
FIG. 1 depicts a block diagram of a data processing environment in which illustrative embodiments may be implemented.

Electronic documents are organized in some structure according to a standard or definition. X.12 documents are organized into file, document, transaction, segment, composite data, and data element. Electronic documents conforming to other standards or definitions may use different labels for each of these artifacts, but essentially organize data in the electronic document in the nested structure. That nested structure includes the largest organization of data, where the largest organization of data includes one or more smaller organizations of data at one or more progressively inner levels in the electronic document, eventually including the actual data to be communicated at the lowest level.

For the clarity of the description below, the highest level of organization in an electronic document is called a "document"; a document may include zero or more "transactions"; a transaction may include zero or more "segments"; a segment may include zero or more "composite data" or "data element"; and a composite data may include zero or more data elements. The terms used in the description of the illustrative embodiments below are consistent with the terms used for defining X.12 documents and are not intended to limit the illustrative embodiments to X.12 documents. These terms may represent a similar organization of data in any electronic document organized according to any standard or definition, whether from a standards body, proprietary, or a combination thereof. Accordingly, the illustrative embodiments may be used for processing any electronic document that uses a similar organization of data in the electronic document.

Illustrative embodiments recognize that existing applications for processing electronic documents ("existing applications") use cumbersome software code and software techniques for the processing the structures involved in the electronic document. For example, an existing application may use code for describing a transformation of an electronic document from one structural form to another. Such an application generally requires modification of code if an electronic document changes its organization at any level For example, if the sender of an electronic document decides to change a certain piece of information in a data element in the electronic document, an existing application requires changes to the code in order to implement that change in the electronic document.

Illustrative embodiments further recognize that the manner in which existing applications process the document is an inefficient way of processing an electronic document. For example, an existing application may process an X.12 document, which is an electronic document based on the ANSI X.12 standard, sequentially form top to bottom Consequently, if a party is interested in only a specific piece of information from the X.12 document, the application still must process the entire document before the application can provide that information of interest to the party. Furthermore, the existing application has to perform that processing sequentially, from the first segment to the last segment, in order, and from the first data element to last data element, again in order, for making any or all information contained in the electronic document available.

Therefore, an improved method and apparatus for processing electronic documents that removes or reduces the above-described inefficiencies in the existing applications are described herein. According to the illustrative embodiments, an electronic document can be analyzed or processed for any piece of information anywhere in the electronic document. In other words, in accordance with the principles of the present invention, an electronic document may be analyzed or processed in one or more segments without having to process the entire electronic document. Furthermore, an electronic document can be modified and the illustrative embodiments altered without extensive code changes to process the modified electronic document.

With reference to the figures, and in particular with reference to FIG. 1, exemplary diagram of a data processing environment is provided in which illustrative embodiments may be implemented. FIG. 1 is not intended to assert or imply any limitation with regard to the environments in which different embodiments may be implemented Many modifications to the depicted environments may be made.

FIG. 1 depicts a block diagram of a data processing environment in which illustrative embodiments may be implemented. Data processing environment 100 includes wide area network (WAN) 102. A WAN, such as WAN 102, is a data network that spans large geographical areas, such as city blocks, cities, countries and continents, such that data processing systems located in those geographies may access the WAN 102. Typically, a commercial entity, such as an Internet service provider (ISP), operates or helps operate the WAN 102. A WAN may provide interconnectivity to large number, possibly tens of thousands, of data processing systems. A data processing system may be one or more devices capable of computing data.

Two or more data processing systems may be in communication with each other through WAN 102. FIG. 1, depicts computers 104,106, and 108 being in communication with WAN 102, and consequently in communication with each other through WAN 102.

A local area network (LAN) is a data network, generally smaller in size and scope than a WAN, providing interconnectivity to a smaller number of data processing systems than the WAN. Generally, LANs are limited to smaller areas, such as homes or offices, and may occasionally span areas larger than homes or offices. A WAN may connect several LANs and data processing systems with each other.

Data processing system 108 communicates with data processing system 110 over LAN 112. Similarly, data processing system 106 communicates with data processing system 114 over LAN 116. A data processing system's connectivity to a LAN or WAN may be wired or wireless. Additionally, a data processing system's connectivity to a LAN or WAN may be direct or through intermediate devices, such as through gateways, modems, switches, or other data processing systems. A data processing system may run software applications that perform a variety of functions. A software application may run on several data processing systems such that parts of the software application run on separate data processing systems. A software application running on several data processing systems in this manner is called a distributed application.

A data processing system, such as data processing system 108, may be a data processing system that is a source of an electronic document whereby that data processing system generates the electronic document. Another data processing system, such as data processing system 106, may be a destination of the electronic document whereby that data processing system is the intended receiver of all or part of the information in the electronic document.

Figure 2:
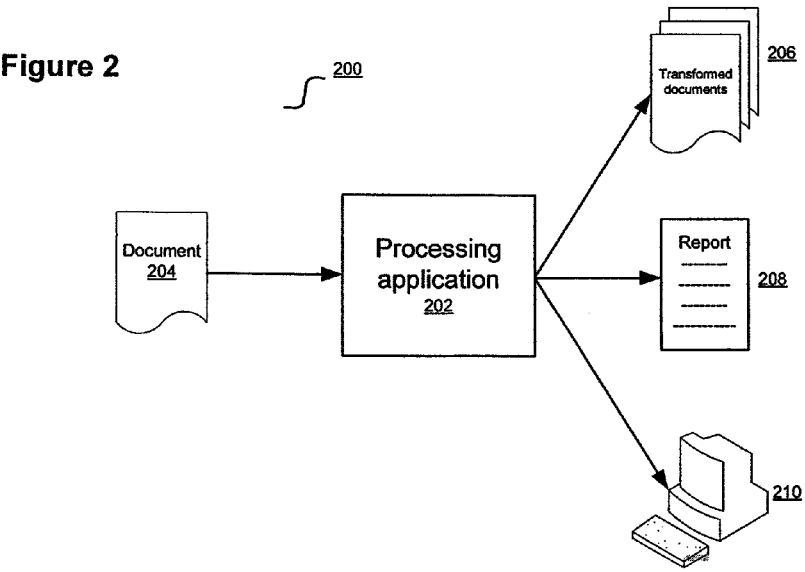
FIG. 2 depicts a block diagram of a processing an electronic document in accordance with an illustrative embodiment.

With reference to FIG. 2, this figure depicts a block diagram of a system for processing an electronic document in accordance with an illustrative embodiment. Processing application 202 may be a software application running on a data processing system, such as data processing system 108 in FIG. 1. Processing application 202 may alternatively be a distributed application running on several data processing systems, such as on data processing system 102 and 108 across LAN 110 in FIG. 1.

Processing application 202 receives an electronic document which may include document 204. Processing application 202 processes document 204 such that one or more transformed documents 206 result from the processing. A transformed document is an electronic document including a document that may have different, less, or more data, or conform to a different structure, than the document from a source, such as document 204. One or more transformed documents 206 may include part of the data in document 204, more or different data than the data in document 204, organized in same or different structure as in document 204.

Processing application 202 may also generate report 208. Report 208 may be a transformed document such as a transformed document in transformed documents 206. Report 208 may also include information from or about one or more documents, such as document 204 and/or one or more transformed document 206. Report 208 may include additional information from an external source, computed information based on data in a document processed by processing application 202. These forms of report 208 are described only as exemplary and are not intended to be biting on the illustrative embodiments. Other forms contents of report 208 will be conceivable from this disclosure.

A party sending an electronic document, a party receiving an electronic document, or a third party may receive reports or perform analyses using processing application 202. Data processing system 210 represents any such parry. Analysis using processing application 202 may be performed on an electronic document being processed or in any combination with archived data from previously processed electronic documents, in any combination with data from sources other than the electronic documents processed by processing system 202.

Figure 3:
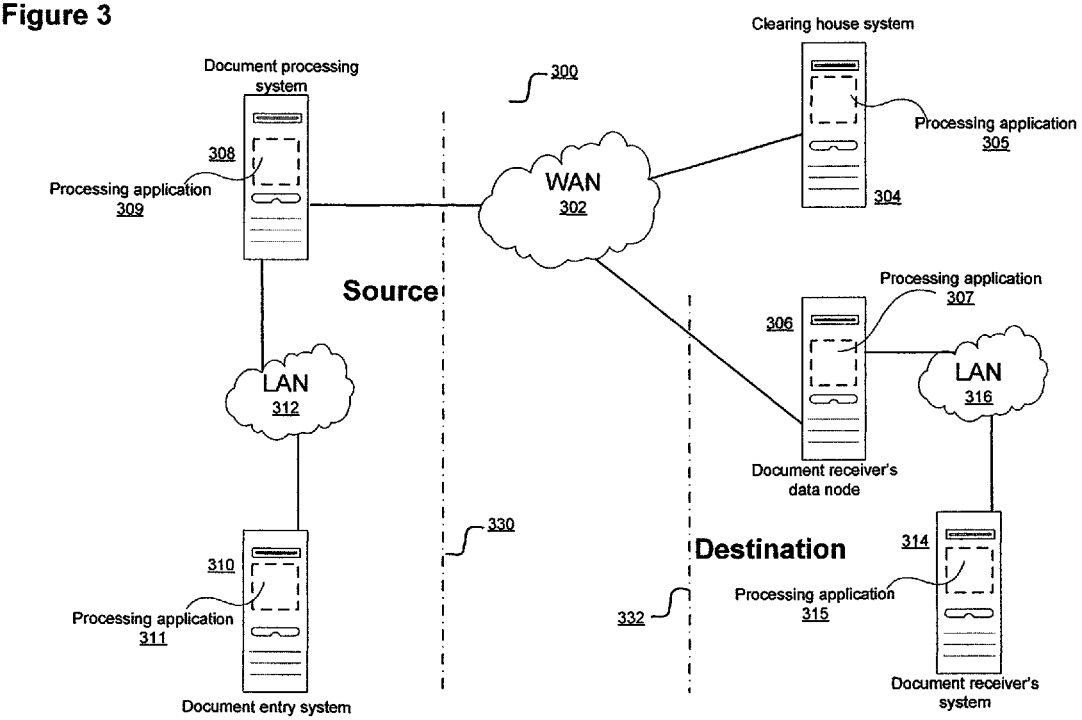
FIG. 3 depicts a block diagram of the various configurations of the processing application in accordance with an illustrative embodiment.

With reference to FIG. 3, this figure depicts a block diagram of the various configurations of an exemplary processing application in accordance with an illustrative embodiment. Data processing environment 300 may be implemented using data processing environment 100 in FIG. 1. WAN 302, data processing systems 304,306,308,310,314, and LANs 312 and 316 are arranged as described with respect to FIG. 1. Processing applications 305,307,309,311, and 315 are each a possible location in data processing systems 304, 306, 308, 310, and 314, respectively, where a processing application, such as processing application 202, may be configured.

In one embodiment, only one processing application from processing applications 305,307, 309, and 315 may be configured in its corresponding data processing system to function in the manner of the illustrative embodiments described below. In such an embodiment, the configured processing application may perform all the processing of an electronic document to enable an exchange of the electronic document between parties.

In another embodiment, more than one processing application from processing applications 305, 307, 309, and 315 may be configured in their corresponding data processing systems. In such an embodiment, a processing system configured on a particular data processing system may perform only a portion of the processing of an electronic document. One or more other processing systems may perform other portions of the processing, thus completing the processing to enable an exchange of the electronic document between parties.

Demarcation line 330 illustrates an exemplary logical source side of data processing environment 300. Data processing systems 308 and 310 in this exemplary configuration are part of a source data processing system that may generate an electronic document, such as document 204 in FIG. 2. Similarly, demarcation line 332 illustrates an exemplary logical destination side of data processing environment 300. Data processing systems 306 and 314 in this exemplary configuration are part of a destination data processing system that may receive an electronic document, such as a transformed document from transformed document 206 in FIG. 2.

In one embodiment of such an exemplarily demarcated configuration, data processing system 310 may be a document entry system which may generate an electronic document. For example, a billing system that generates an invoice in the form of an electronic document may act as a document entry system, such as data processing system 310. The document entry system may include processing application 311 for generating the invoice.

In another embodiment of the exemplarily demarcated configuration, data processing system 308 may be a document processing system which may process an electronic document generated by a document entry system For example, an invoice submitting system that creates an electronic document including several invoices, consolidated from several billing entries entered in another system that may act as a document processing system, such as data processing system 308. The document processing system may include processing application 309 for converting billing entries into invoices.

In another embodiment, data processing system 304 may be a clearing-house system. A clearing-house system accepts an electronic document generated by one party's data processing system and processes the electronic document according to the needs of another party. For example, a clearing-house system may receive an electronic document including several invoices from a source, such as a medical services provider. The clearing-house system may transform the file into several electronic documents and send to different destinations, such as insurance payer companies. The clearing-house system may include processing application 305 for transforming the electronic document from the source to the electronic documents being sent to the destinations.

In another embodiment, data processing system 306 may be a document receiver's data node system. A data node system, particularly a data node system within a destination paws infrastructure, is a data processing system that acts as a clearing-house system, but for only that destination party. A data node system may process an electronic document generated by one party's system according to the needs of the party that is the destination of that electronic document. A data node system may also monitor or facilitate the movement of data across various data processing systems, such as by buffering data for a period of time or while waiting for an event to occur, before sending the data to another data processing system For example, a document receiver's data node system may receive an electronic document including an invoice. The document receiver's data node system may transform the electronic document into several pieces of information and send to different systems at the destination. The receiver's data node system may include processing application 307 for transforming the electronic document containing the invoice to the pieces of information being sent to the various systems at the destination.

A data node system may also act as a data interface between data processing systems using two different data formats. For example, acting in a clearing-house system type role, the data node system may translate data from one data processing system in one format into data to another data processing system in another format so that the two data processing systems may exchange data with each other.

In another embodiment, data processing system 314 may be one of the document receiver's data processing system, which may process a piece of information sent to it by the receiver's data node system For example, a document receiver's data processing system may receive an identifier for a patient who is named in an invoice. The document receiver's data node system may transform the identifier into patient information perform other functions related to processing an invoice at the destination. The receiver's data node system may include processing application 315 for transforming the patient identifier into patient information at the destination.

The above embodiments are described only as exemplary and are not intended to be limiting on the illustrative embodiments. Many other configurations will be conceivable from this disclosure and are contemplated within the scope of the illustrative embodiments.

Furthermore, a particular embedment may be a combination of any of the above-described embodiments or other embodiments conceivable from this disclosure. For example, in one embodiment, a data node system may also act as a document processing system, as described above with respect to data processing system 308, and vice-versa. In another embodiment, a data processing system may include functions of a document processing system, a clearing-house system, and a data node system, a document entry system, a document receiver's system, another data processing system, or any combination thereof.

Figure 4:
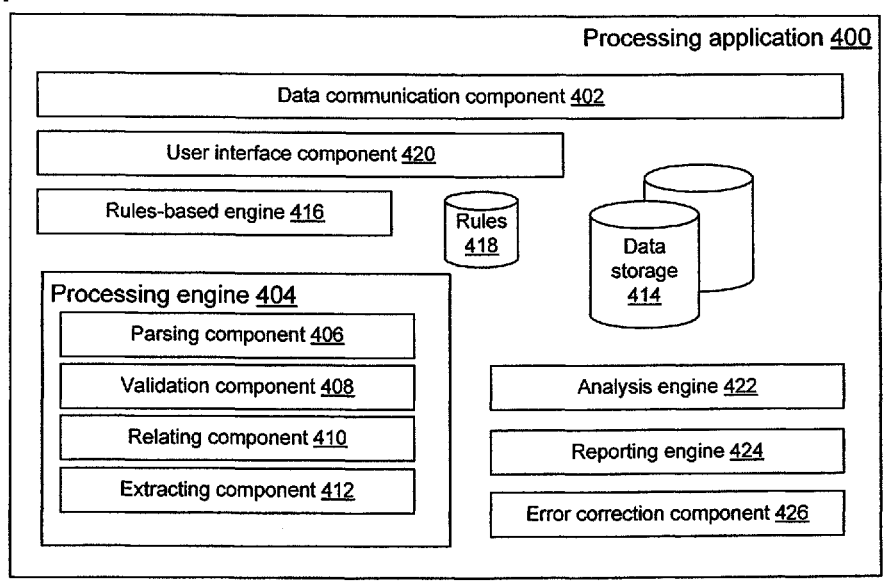
FIG. 4 depicts a block diagram of a processing application in accordance with an illustrative embodiment.

With reference to FIG. 4, this figure depicts a block diagram of a processing application in accordance with an illustrative embodiment. Processing application 400 may be implemented using processing application 202 in FIG. 2, or any of processing applications 305,307,309,311, or 315 in FIG. 3.

Processing application 400 includes data communication component 402. Data communication component 402 may provide data communication capabilities to processing application 400 for communicating with a WAN, such as WAN 302 in FIG. 3. Through providing such capabilities, data communication component 402 may receive electronic documents, transmit electronic documents, and support any other data communication needs of processing application 400.

Processing application 400 further includes processing engine 404. Processing engine 404 is one of the components of processing application 400 that manipulates the electronic documents processed by processing application 400.

Processing engine 404 includes parsing component 406, validation component 408, relating component 410, and extracting component 412. Any of these components may use a storage space, such as data storage 414, for storing the data during the processing of the electronic document. Data storage 414 may be any type of storage suitable for storing data.

Parsing component 406 may identify an electronic document's data components and separate those data components out based on rules for parsing. Rules and handling of rules in processing application 400 is described in detail herein below. Validation component 408 may validate the structure and contents of the various data components of the electronic document identified by parsing component 406 based on rules for validating. Relating component 410 may identify, draw, or form relationships amongst the various data components of an electronic document as identified by parsing component 406 based on rules for identifying and rules for relating. Extracting component 412 can select, extract, transform, or present specified data from an electronic document based on rules for selecting, rules for extracting, and rules for transforming. Extracting component 412 may also select a specific data element identified in an electronic document by parsing component 406 and assign it a label.

The processes of parsing an electronic document, validating the data components and their relations, extracting information, assigning a label, and transforming information are processes related to one or more of creating a rule, modifying a rule, and executing a rule, such as a rule for parsing, a rule for validating, a rule for relating, a rule for selecting, a rule for extracting, a rule for transforming, or other rules.

The above-described components of processing engine 404 are described only as exemplary for the clarity of the functioning of processing engine 404. These components are not intended to be limiting on the illustrative embodiments and may be combined, modified, reorganized, or enhanced according to the needs of a particular implementation. For example, in one embodiment, the functions of validating component 408 may be combined with the functions of parsing component 406 to result in a single component that acts as parsing component 406, as well as validating component 408.

As another example, in another embodiment, parsing component 406 and extracting component 412 may be combined to identify specific data in an electronic document from a source, label that data, transform that data, and present that transformed and labeled data into another electronic document for a destination.

Processing application 400 further includes rules-based engine 416. Rules-based engine 416 is a component that can be invoked by other components to execute rules. In one embodiment, rules-based engine 416 may not be a separate component as depicted in FIG. 4, but is included in other components that use rules. For example, in one embodiment using the form of rules-based engine 416, parsing component 406 may include rules-based engine 416.

Rules may be stored in a data storage, such as rules 418. Rules 418 is a data storage for rules, and may or may not be separate from data storage 414. As an example, extracting component 412 may invoke rules-based engine 416 to execute a rule for extracting from rules 418. The rule for extracting when executed by rules-based engine 416 may enable extracting component 412 to extract a specific data element identified in an electronic document by parsing component 406 and assign it a label "provider name" as described above.

Rules 418 may include a variety of rules. As in the examples above, a rule for parsing may assist in the parsing function of parsing component 406. For example, a rule for parsing pertaining to healthcare claims in an X.12 837 healthcare claim document ("837 document") may assist parsing component 406 in traversing the 837 document and identifying the various data components of the 837 document.

Similarly, a rule for extracting may assist in the extracting and labeling function of extracting component 412. A rule for identifying may be a rule that helps parsing component 406 in identifying the various data components of a specific electronic document. A rule for validating may assist validating component 408 in validating some data components of an electronic document. A rule for validating may also assist in validating a relationship between data components.

A rule for relating may help relating component 410 in identifying relationships amongst data components of an electronic document based on a certain criterion. A rule for transforming may help extracting component 412 in transforming an extracted data into another form. A rule for selecting may help extracting component 412 in selecting certain data for extraction. A rule for generating may help extracting component 412 in generating a report or another document using some extracted data.

A rule may assist in one or more functions of one or more components. For example, a rule may be a rule for parsing, as well as a rule for validating in that different instructions in the same rule may help parsing component 406 in parsing and validating component 408 in validating.

These examples of the various rules are described above to show the various types of rules that are possible for use with the described components of processing application 400. These examples f d e r describe the variety of functions in which these types of rules can assist. However, these examples of the various rules are not intended to be limiting on the illustrative embodiments. Many other rules will be conceivable from these examples and associated descriptions. Additionally, rules may be combined, new rules and rule types may be created, and some of the above-described rules and rule types may be omitted in specific implementations.

Furthermore, the examples of processing an 837 document are used only for the clarity of the description and are not limiting on the illustrative embodiments. Any electronic document may be processed using processing application 400 in the same or similar manner.

Processing application 400 may further include user interface component 420. User interface component 420 may provide a way for a user to interact with processing application 400, such as for defining or modifying a rule in rules 418 or modifying the processing of a rule in rules-based engine 416.

User interface component 420 may present any human or system interface convenient for a particular implementation. For example, in one embedment, user interface component 420 may present a graphical user interface on a computing device for a human user to interact with processing application 400. For example, the human user may graphically define, modify, or remove a rule such that the human user does not have to manipulate software code for configuring a rule. In another embodiment, user interface component 420 may present a set of application programming interface (API) for a system to perform the same exemplary functions. A particular implementation may use these and any other suitable interfaces in any combination in implementing user interface component 420.

Processing application 400 may further include analysis engine 422. Analysis engine 422 may help in analyzing data from any electronic documents that may be presently being processed or may have been processed by processing application 400. Data from present and past electronic documents may be stored in a data storage, such as data storage 414, for the purposes of such analyses. For example, analyzing the data in this manner, analysis engine 422 may be able to find out which payers were late beyond 90 days in paying the claims presented to them Such analyses may be triggered by a user, may be scheduled, or may occur as a result of certain events. For example, not receiving an acknowledgment of the receipt of a claim by a payer may be an event that triggers an analysis of the data for the pattern of behavior of that payer as to the acknowledgments. Furthermore, analysis engine 422 may interact with user interface component 420 so that a human or system user may request specific analysis of the data.

Analysis engine 422 may also interact with rules-based engine 416 such that rules-based engine 416 may execute certain analysis rules to assist the various analyses performed by analysis engine 422. For example, a rule for analyzing may be that all the names in a set of one or more payer names identify a common payer. Another exemplary analysis rule may be that when a payer fails to acknowledge receipt of a healthcare claim document, data pertaining to that fact should be added to the data storage and a report of the number of times that payer has faded to acknowledge a document should be generated. These exemplary rules show that analysis engine 422 may interact with other components of processing application 400, such as reporting engine 424, described next.

Reporting engine 424 generates reports, such as the report identified in the previous example of an analysis rule. Reporting engine 424 may also generate reports on the contents of an electronic document presently being processed by processing application 400, was processed in the past by processing application 400 or another system, data in data storage 418, or a combination thereof.

Processing application 400 may also include error correcting component 426. In one embodiment, when parsing component 406 encounters an error in parsing an electronic document, error correcting component 426 may be able to apply a rule for error correcting from rules 418 and using rules-based engine 416, to correct that error. For example, if the error in parsing is that a date should be eight digits long but is provided a six-digit date, an error correction rule may help error correction component 426 in modifying the date in the electronic document to its correct length so that parsing component 406 may proceed As another example, in an X.12 document, a segment delimiter may be missing, causing parsing component 406 to encounter an error or the validation component failing to validate the structure of the document, or the relating component failing to find correlating information from the next segment. Error correction component 426, using an error correction rule, may be able to provide the missing delimiter and restart or continue the parsing, validating, or relating functions.

Note that these components, rules, and processing functions are described only as exemplary components of processing application 400. These components, rules, and processing functions are not intended to be limiting on the illustrative embodiments. Many other new components, rules, and processing functions, or combinations of the same will be apparent from this disclosure.

With reference to FIG. 5, a processing rule is depicted in accordance with an illustrative embodiment. Rule 500 may be implemented as a rule in rules 418 in FIG. 4. Rule 500 may be executed by rules-based engine 416. Rule 500 may be used by parsing component 406 in processing engine 404 of processing application 400 in FIG. 4.

Rule 500 is an exemplary processing rule that may be used in the illustrative embodiments for processing an exemplary X.12 version 4010 270 document that pertains to an eligibility and coverage of benefits inquiry in the healthcare industry. A processing rule, such as rule 500, may be-a rule for parsing and may be used for parsing an electronic document. The rule 500 may contain processing information about various data components of the electronic document. For example, rule 500 contains processing information about groups of segments that constitute the X.12 270 document according to a corresponding specification in the ANSI X.12 specifications. Rule 500 may be identified by rule identifier 501 which is a unique identifier for rule 500 within the scope of a processing application.

Each group of segments described in this manner is called a loop. Loop 502 is an example of processing instructions for a loop in the 270 document.

Using loop 502 as an example for illustrating the functioning of the processing instructions in rule 500, each loop is identified by a loop identifier, such as loop identifier 504 which, in the case of exemplary loop 502, has the value "2100*b*." Informative text can be added after a space or another delimiter following loop identifier 504. Such information may be ignored in processing or may be used for specific processing functions, for example, for inserting comments in a processing log.

Loop 502 next lists processing instructions for the various segments that the specification specifies for that loop. For example, according to the X.12 version 4010 specification for a document of type 270, segment 506 should be the first segment to occur in loop 502. A segment that is identified in a loop, such as segment 506 in loop 502, may have a segment identifier, such as segment identifier 508 which, in the exemplary loop 502, is the string "nml." Note that a segment identifier is a data component identifier and may be any suing in a segment or data component at a known location. For example, a segment identifier may include the first and second data elements in the segment and may further include the delimiter between the first and the second data elements. For example, instead of "nml," segment identifier 508 may have a value of "nml*21" which includes "nml," the segment identifier according to X.12 standards, and "21" which is the first data element—entity identifier code—identifying an entity with a two digit code. "*" is the delimiter that separates the segment identifier and the entity identifier code data element in this example.

A segment may be mandatory or required, or optional or situational. Exemplary segment 506 includes usage indicator 510 which may have a value of "r" for required and "s" for situational. A segment may repeat a number of times in a loop. An occurrence indicator indicates how many times a segment may repeat in a loop. Exemplary segment 506 includes occurrence indicator 512, whose value in this example is "1," indicating that segment "nml" may occur exactly once in loop "2100*b*."

Informative text can be added after a space or another delimiter following occurrence indicator 512. Such information may be ignored in processing or may be used for specific processing functions, for example, for inserting comments in a processing log. Additional instructions for processing of a particular segment may be added in place of the informative text. For example, data elements may be specified by type, nature, usage, repetition, content, or size in order to process a segment's constituent data elements before progressing to the next segment in the loop.

Once instructions for processing a data component of the electronic document are complete, the instructions may include a directive to perform a next function, such as to proceed to other instructions for processing other data components of the electronic document. For example, when the segments for loop 502 are defined, loop 502 may include a directive to proceed to another loop. In the exemplary loop 502, directive 514 includes action 516. Action 516 in this case is "goto" which is an instruction to proceed to another loop. Action 516 may be contingent upon one or more conditions.

Here, action 516 is shown to depend on condition 518. Condition 518 here is a segment identifier "h1*22" which indicates that the action 516 "goto" should be performed when the next segment after the segments listed in loop 502 has a segment identifier "h1*22." Target 520 in this example is a loop identifier of a loop whose instructions should be processed next. Here, target 520 has a value "2000*c*." Thus, exemplary directive 514 in this exemplary loop 502 indicates that the processing of exemplary X.12 270 document should' proceed from loop identifier "2100*b*" to loop identifier "2000~" if the segment following segments of loop "2100*b*" has segment identifier "h1*22."

Thus, exemplary rule 500 is designed to process an X.12 version 4010 document 270. A processing rule may be designed according to the illustrative embodiments to process any electronic document. Such processing rule according to the illustrative embodiments may proceed by identifying a data component of the electronic document, such as a loop with a group of segments. The processing rule may include a specification of the data component by including one or more data component attributes, such as constituent segments, constituent data elements, or constituent group of segments, with their constituent data elements. The specification may further include one or more directives being based on one or more conditions for subsequent processing.

By executing a rule according to the illustrative embodiments as described above, the structure of an electronic document may be verified and the content parsed out. Using the structural information and the paned out contents of the electronic document, another rule, or additional instructions in the same rule can perform additional functions. For example, a rule for validating may validate the parsed out content, a rule for relating may relate data components with one another.

With reference to FIG. 6, h figure depicts a timing diagram representing a processing of an electronic document in accordance with an illustrative embodiment. The interactions of FIG. 6 may be implemented using processing application 400 in FIG. 4. The interactions of FIG. 6 may be implemented in data processing environment 300 in FIG. 3.

Source 602 may be a source of an electronic document, such as data processing system 310 in FIG. 3. Processing application 604 may be processing application 309 in FIG. 3. Destinations 606 are depicted as three destinations as exemplary to show that any number of destinations, such as data processing system 314 in FIG. 3, may be present in a data processing environment implementing the illustrative embodiments. Report destination 608 may be one of the destinations in destinations 606, or may be another data processing system or user of a report, such as data processing system 210 in FIG. 2.

Source 602 may send electronic document 610 to processing application 604. Processing application 604 may send one or more transformed documents 612, 614, and 616 to one or more destinations in destinations 606. A destination in destinations 606 may respond to transformed documents 612, 614, and 616 with one or more response documents 618, 620, and 622.

Furthermore, processing application 604 may respond to source 602 with response document 624. Processing application 604 may send report 626 to report destination 608.

In one embodiment, destinations 606, as well as processing application 604, may not respond with a response document. In another embodiment, some destinations in destinations 606 may respond with response documents and others may not. In another embodiment, destinations 606 may or may not respond with response documents, but processing application 604 may respond with a response document to source 602. An embodiment may incorporate any of these embodiments and other variations in these embodiments. An embodiment may or may not include report 626 in combination with the above-described exemplary embodiments.

Figure 7:
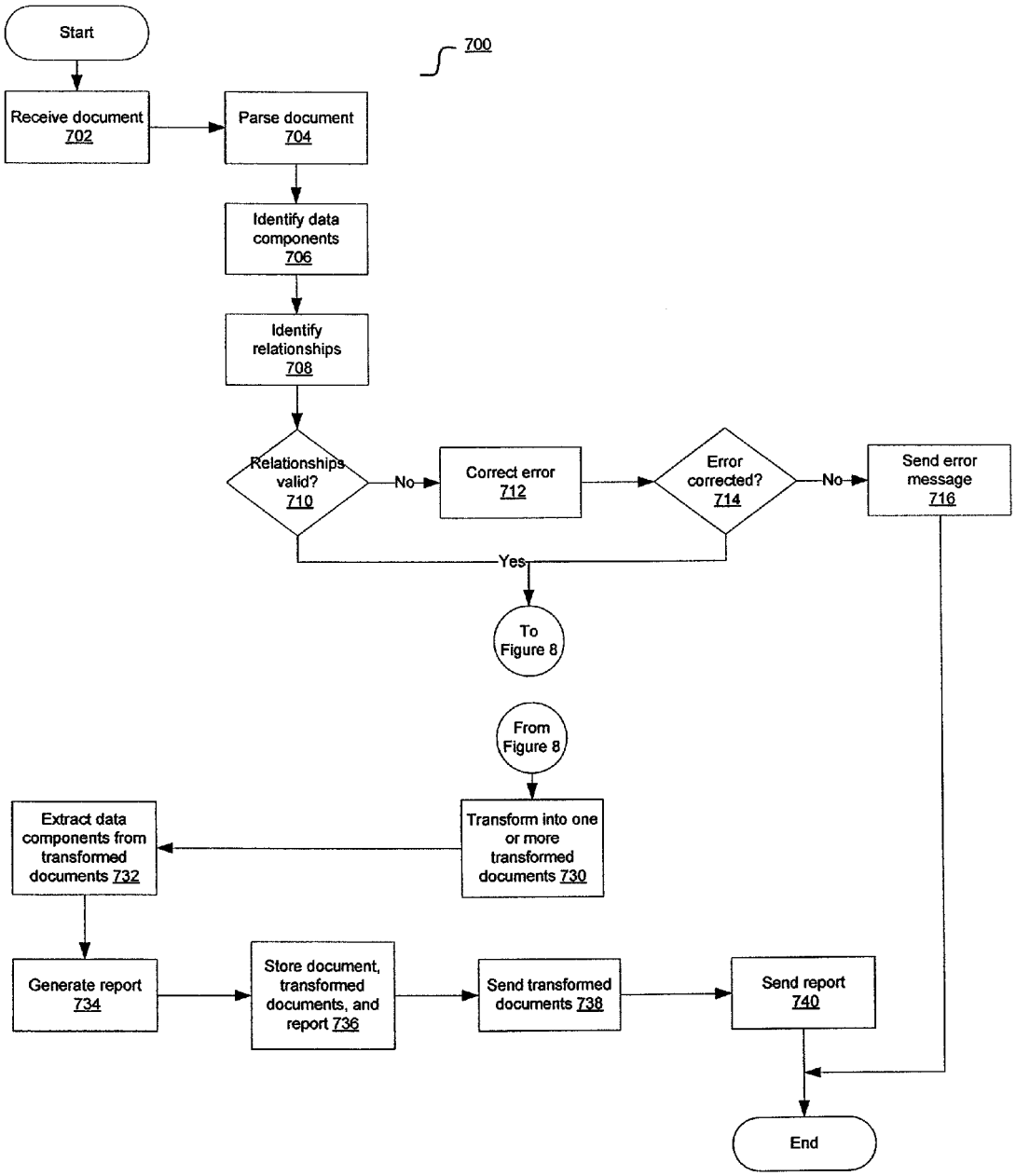
FIG. 7 depicts a flowchart of a process of processing an electronic document in accordance with an illustrative embodiment.

With reference to FIG. 7, this figure depicts a flowchart of a process of processing an electronic document in accordance with an illustrative embodiment. Process 700 may be implemented in processing application 400 in FIG. 4.

Process 700 may receive an electronic document including one or more documents. The process begins by receiving a document (step 702). The process panes the document (step 704). The process identifies zero or more data components included in the document (step 706). The process identifies relationships between two or more data components identified in step 706 (step 708). Note that steps 704, 706, and 708 are depicted in that order only as exemplary and may be performed in any order depending on the specific implementation of the illustrative embodiments.

The process determines whether the relationships identified in step 708 are valid (step 710). If one or more relationships are not valid, ("No" path of step 710), the process proceeds to step 712 to correct the error. The process then determines whether the error has been corrected (step 714). If the error has not been corrected, ("No" path of step 714), the process may send an error message, such as to a source of the document received in step 702 (step 716). The process ends thereafter.

Figure 8:
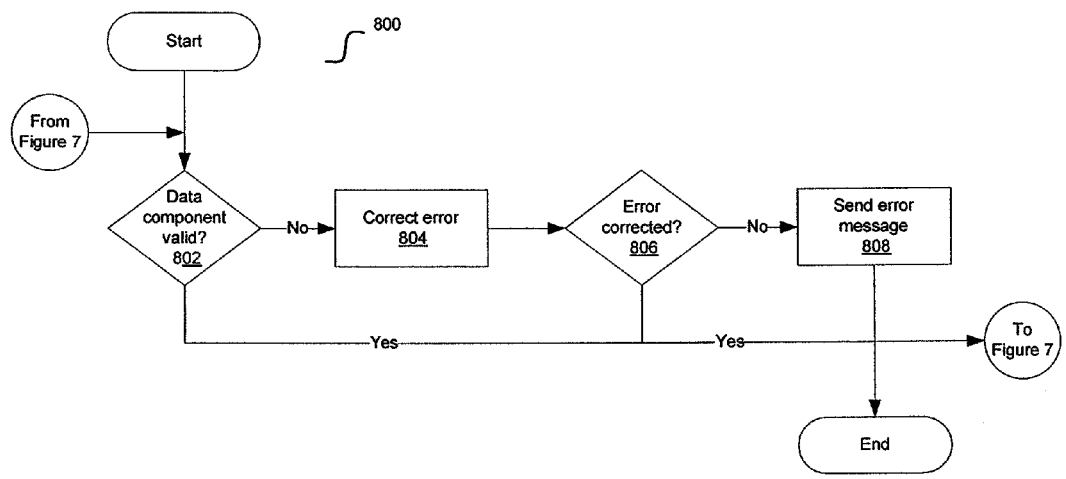
FIG. 8 depicts a flowchart of the error correction process for correcting errors in the data components of an electronic document in accordance with an illustrative embodiment.

Returning to step 710, if the relationships identified in step 708 are valid, ("Yes" path of step 710), the process proceeds to the process in FIG. 8. Additionally, if the error has been corrected, ("Yes" path of step 714), the process proceeds to the process in FIG. 8. Note that a specific implementation may be able to proceed to the process in FIG. 8 from the "Non path of step 710, even if one or more relationships identified in step 708 are not valid, such as by making additional determinations. Similarly, a specific implementation may be able to proceed to the process in FIG. 8 from the "Non path of step 714, even if one or more errors have not been corrected.

When process 700 returns from the process in FIG. 8, the process transforms the document (step 730). In one embodiment, process 700 may end thereafter.

However, FIG. 7 depicts additional steps that may be incorporated in process 700. For example, process 700 may extract one or more data components from one or more transformed documents generated in step 730 (step 732). Process 700 may use the extracted data components to generate a report (step 734).

Process 700 may also perform other optional functions. For example, the process may store the document received in step 702, one or more transformed documents, and the report (step 736). Furthermore, the process may perform step 736 before sending either the transformed documents or the report. As FIG. 7 depicts, in one embodiment, process 700 may then send the transformed documents to their respective destinations (step 738). The process may send the report to its destination (step 740). The process ends thereafter. In another embodiment, the sending of the transformed documents and the report may occur simultaneously with or before the storing of step 736.

With reference to FIG. 8, this figure depicts a flowchart of the error correction process for correcting errors in the data components of an electronic document in accordance with an illustrative embodiment. Process 800 may be implemented in processing application 400 in FIG. 7 and may execute in conjunction with the process in FIG. 7.

Process 800 begins by determining whether one or more of the data components in an electronic document are valid (step 802). When process 800 executes in conjunction with process 700, step 802 may be performed after the relationships are determined to be valid in step 710 in FIG. 7, or when errors have been corrected in step 714 in FIG. 7.

If a data component is not valid, ("Non path of step 802), the process corrects the error (step 804). The process then determines if the error has been corrected (step 806). If the error has not been corrected, ("Non path of step 806), the process may send an error message, such as to a source of the document received in step 702 in FIG. 7 (step 808). The process may end thereafter or return to process 700 in FIG. 7. Alternatively, process 800 may end, also ending process 700 in FIG. 7.

Returning to step 802, if the data components are valid, ("Yes" path of step 802), the process ends or returns to the process in FIG. 7. Additionally, if the error has been corrected, ("Yes" path of step 806), the process ends or proceeds to the process in FIG. 7. Note that a specific implementation may be able to proceed to the process in FIG. 7 from the "No" path of step 802, even if one or more data components are not valid, such as by making additional determinations. Similarly, a specific implementation may be able to proceed to the process in FIG. 7 from the "No" path of step 806, even if one or more errors have not been corrected.

Figure 9:
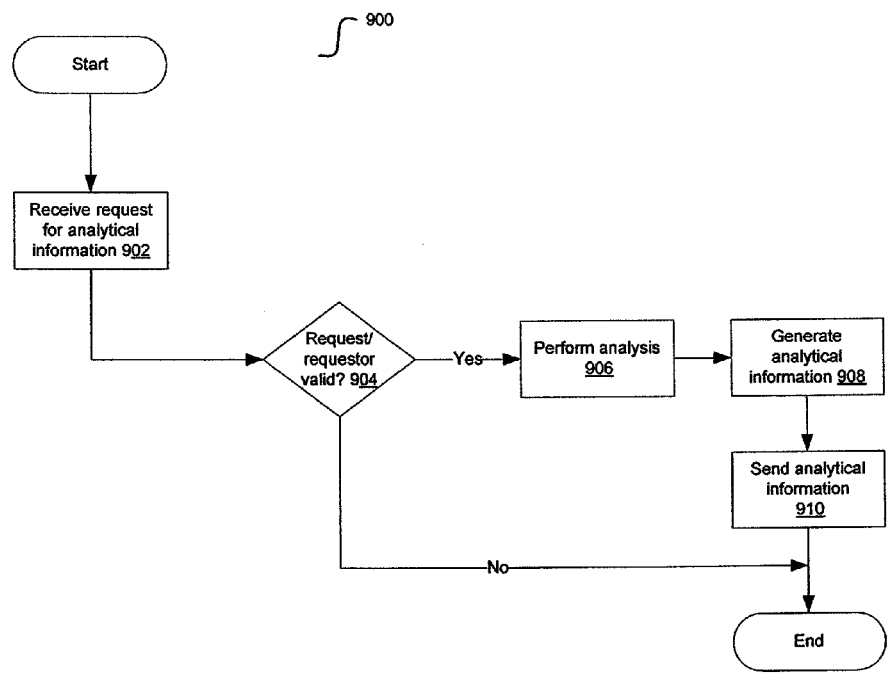
FIG. 9 depicts a process of performing analysis of electronic documents in accordance with an illustrative embodiment.

With reference to FIG. 9, this figure depicts a process of performing an analysis of electronic documents in accordance with an illustrative embodiment. Process 900 may be implemented in processing application 400, such as in analysis engine 422 in FIG. 4.

Process 900 begins by receiving a request for analytical information (step 902). Analytical information is information resulting from an analysis of other data, such as data from electronic documents currently being processed by the processing application or data from electronic documents that have been processed by the processing application in the past.

In one embodiment, process 900 may authenticate the request or the requestor of the analytical information (step 904). The process may then determine if the request or the requestor are valid (step 904). In another embodiment, the process may omit the authentication step.

If the request or the requestor are valid, ("Yes" path of step 904, or if the implementation of process 900 has omitted step 904, the process performs the requested analysis, such as by using rules for analysis in Rules 418 and data in data storage 414 in FIG. 4 (step 906). The process generates the requested analytical information (step 908). The process sends the requested analytical information to the requestor (step 910). The process ends thereafter.

Note that the steps of processes 700, 800, and 900 are selected and described only for clarity of the description and are not limiting on the illustrative embodiments. Depicted steps may be combined, further divided, augmented to, deleted, or modified in particular implementations.

Thus, in the illustrative embodiments described above, a computer implemented method, apparatus, and computer program product provide for processing electronic documents. The illustrative embodiments describe a processing application, including a processing engine that parses the electronic documents into its data components, validates, relates, and transforms the electronic documents and its data components, and extracts data components from transformed documents into other types of documents. The method, apparatus, and computer-usable program product of the illustrative embodiments present a method of parsing, validating, relating, transforming, and extracting electronic documents that may reduce or remove the shortcomings associated with the presently-used methods for processing electronic documents.

For example, by using the illustrative embodiments, an electronic document need not be analyzed, parsed, or validated, sequentially from top to bottom If a party is interested in only a specific piece of information from an electronic document, the illustrative embodiments can provide that information of interest to the party without having to process the entire document by suitably configuring the rules for parsing, the rules for validating, the rules for relating, the rules for extracting, and other types of rules as needed Thus, the illustrative embodiments may make any and all information contained in an electronic document available without processing the electronic document from the first segment to the last segment, in order, and from the first data element to last data element, again in order.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROW, a rigid magnetic disk and an optical disk Current examples of optical disks include compact disk-read-only memory (CD-ROM, compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link This communication link may use a medium that is, for example without limitation, physical or wireless.

The above description has been presented for purposes of illustration and description and is not intended to be exhaustive or limited to the illustrative embodiments in the form disclosed. Many modifications and variations will be apparent to those of ordinary skill in the art.

What is claimed:

1. A system for processing a document, the system comprising:
    a data storage unit configured to store data corresponding to at least one of the document, a plurality of documents processed at a previous time, and a set of rules wherein at least one rule in the set of rules is configured to include a rule identifier, a directive to proceed to a second rule based on a condition, a specification of a data component, the specification configured to include a data component identifier, a data component attribute, and a directive to proceed to a second specification of a second data component based on a second condition;
    a rules-based engine configured to communicate with the data storage unit and to execute a rule in the set of rules;
    a processing engine configured to include a parsing component, a validating component, a relating component, and an extracting component, the processing engine further configured to communicate with the data storage unit to process the document in a non-sequential manner and to select and execute the at least one rule using the rules-based engine;
    an error correction component configured to communicate with at least one of the rules-based engine and the processing engine; and
    a data communication component configured to communicate with at least one of the data storage unit, the rules-based engine, the processing engine, the analysis engine, the reporting engine, and the error correction component, wherein the system is configured to process the document using the data storage unit, the rules based engine, the processing engine, and the error correction component to transform the document into a set of second documents and generate a third document, and wherein the system is configured to use the data communication component to deliver the second documents in the set of second documents to their respective destinations.

2. The system of claim 1, further comprising:
    an analysis engine configured to communicate with at least one of the rules-based engine, the processing engine, and the data storage; and
    a reporting engine configured to communicate with at least one of the rules-based engine,
    the processing engine, and the analysis engine.

3. The system of claim 2, wherein the analysis engine is further configured to receive a request for analytical information, to perform analysis of the stored information according to the request, and to return a result of the analysis.

4. The system of claim 2, wherein the reporting engine receives the request from one of a source of the document, a destination of a transformed document in a set of transformed documents, a destination of a report, and an independent party.

5. The system of claim 2, wherein the system is further configured to authenticate one of the request and a source of the request.

6. The system of claim 2, further comprising:
a user interface component configured to communicate with at least one of the data storage, the rules-based engine, the processing engine, the analysis engine, the reporting engine, and the error correction component, the user interface component further configured to graphically configure one or more rules in the set of rules, to graphically create a new rule, to graphically include the new rule in the set of rules, and to graphically modify a rule other than the new rule in the set of rules to reference the new rule.

7. The system of claim 1, wherein the set of rules is further configured to include one or more of a rule for parsing, a rule for validating, a rule for identifying, a rule for relating, a rule for selecting, a rule for extracting, a rule for transforming, a rule for generating, a rule for analyzing, a rule for error correcting, and a rule for reporting.

8. The system of claim 7, further wherein the rule for transforming is configured to include an identification associated with the document, an identification associated with a transformed document, and a logic, wherein the logic is configured to determine a number of transformed documents present in a set of transformed documents, and one or more attributes of each transformed document in the set of transformed documents.

9. The system of claim 8, wherein the attributes of each transformed document include one or more of a type of the transformed document and a destination of the transformed document.

10. The system of claim 8, wherein the rule for extracting in the set of rules is configured to extract data components from the set of transformed documents and to create a report from the extracted data components.

11. The system of claim 10, wherein the data storage unit is further configured to store at least one of the document, the set of transformed documents, and the report to form stored information.

12. The system of claim 8, wherein the data communication component is further configured to send each transformed document to the destination of the transformed document.

13. The system of claim 12, wherein a rule for sending in the set of rules is configured to include one or more of an indication of a method of communication to use with the destination of the transformed document, a response document to send to a source of the document, and a response document to receive from the destination of the second document.

14. The system of claim 7, wherein the rule for analyzing in the set of rules is configured to include a plurality of steps of the analysis.

15. The system of claim 7, wherein the rule for error correcting in the set of rules is configured to identify an error in one of a data component and a relationship between two or more data components, and to correct the error.

16. The system of claim 15, wherein the rule for error correcting is further configured to return an error status to the source of the document if the error is not corrected.

17. The method of claim 7, wherein a rule in the set of rules is configured to include a combination of the rule for parsing, the rule for validating, the rule for identifying, the rule for relating, the rule for selecting, the rule for extracting, the rule for transforming, the rule for generating, the rule for analyzing, the rule for error correcting, and the rule for reporting.

18. A method for processing a document, the method comprising:
storing, in a data storage unit, data corresponding to at least one of the document, a plurality of documents processed at a previous time, and a set of rules wherein at least one rule in the set of rules is configured to include a rule identifier, a directive to proceed to a second rule based on a condition, a specification of a data component, the specification configured to include a data component identifier, a data component attribute, and a directive to proceed to a second specification of a second data component based on a second condition;
communicating with the data storage unit;
executing a rule in the set of rules for processing the document in a non-sequential manner, the processing including performing of parsing, validating, relating, and extracting;
selecting a second rule in the set of rules;
executing the second rule in the set of rules for performing an error correction;
transforming the document into a set of second documents;
generating a third document from the set of second documents, and
delivering the second documents in the set of second documents to their respective destinations.

19. The method of claim 18, further comprising:
receiving a request for analytical information from one of a source of the document, a destination of a transformed document in a set of transformed documents, a destination of a report, and an independent party;
authenticating one of the request and a source of the request;
performing analysis of the stored information according to the request; and
returning a result of the analysis.

20. The method of claim 18, further comprising:
graphically configuring one or more rules in the set of rules;
graphically creating a new rule;
graphically including the new rule in the set of rules; and
graphically modifying a rule other than the new rule in the set of rules to reference the new rule.

21. The method of claim 18, wherein the set of rules is further configured to include one or more of a rule for parsing, a rule for validating, a rule for identifying, a rule for relating, a rule for selecting, a rule for extracting to extract data components from the set of transformed documents and to create a report from the extracted data components, a rule for transforming, a rule for generating, a rule for analyzing including a plurality of steps of the analysis, a rule for error correcting, wherein the rule for error correcting includes instructions for identifying an error in one of a data component and a relationship between two or more data components and instructions for correcting the error or return an error status to the source of the document if the error is not corrected, a rule for reporting, and a rule for sending.

22. The method of claim 21, further wherein the rule for transforming is configured to include an identification associated with the document, an identification associated with a transformed document, and a logic, wherein the logic is configured to determine a number of transformed documents present in a set of transformed documents, and one or more attributes of each transformed document in the set of transformed documents wherein the attributes of each transformed document include one or more of a type of the transformed document and a destination of the transformed document.

23. The system of claim 21, wherein a rule for sending in the set of rules is configured to include one or more of an indication of a method of communication to use with the destination of the transformed document, a response document to send to a source of the document, and a response document to receive from the destination of the second document.

24. The method of claim 21, wherein a rule in the set of rules is configured to include a combination of the rule for parsing, the rule for validating, the rule for identifying, the rule for relating, the rule for selecting, the rule for extracting, the rule for transforming, the rule for generating, the rule for analyzing, the rule for error correcting, and the rule for reporting.

* * * * *